June 28, 1960 F. Z. FOUSE 2,942,720
ARTICLE SPACING MECHANISM
Filed July 1, 1957 3 Sheets-Sheet 1

INVENTOR.
FREDERICK Z. FOUSE
BY
ATTORNEY

June 28, 1960

F. Z. FOUSE 2,942,720

ARTICLE SPACING MECHANISM

Filed July 1, 1957

INVENTOR.
FREDERICK Z. FOUSE

BY

ATTORNEY

June 28, 1960 F. Z. FOUSE 2,942,720
ARTICLE SPACING MECHANISM
Filed July 1, 1957 3 Sheets-Sheet 3

INVENTOR.
FREDERICK Z. FOUSE
BY
ATTORNEY

United States Patent Office 2,942,720
Patented June 28, 1960

2,942,720

ARTICLE SPACING MECHANISM

Frederick Z. Fouse, Lancaster, Ohio, assignor to Anchor Hocking Glass Corporation, Lancaster, Ohio, a corporation of Delaware Filed July 1, 1957, Ser. No. 669,317

9 Claims. (Cl. 198—34)

The present invention relates to a mechanism for spacing or positioning articles on a moving conveyor and more particularly to a mechanism which engages an article in a group of unevenly spaced or irregularly positioned articles and accurately spaces and positions the article on the conveyor.

Glassware, such as tumblers and glass containers, is generally manufactured on automatic machinery which delivers the molded ware to conveyors which in turn deliver the ware for other operations such as inspecting, weighing and annealing. In some cases, the conveyor may serve more than one molding machine and some containers will be close together and others a greater distance apart. Even in situations where one conveyor serves a single machine, the containers will not be accurately positioned on the conveyor; their spacing will vary. Certain machines receiving containers from the conveyor require them to be at predetermined intervals on the moving conveyor and in accurate position both laterally and longitudinally of the conveyor.

Star wheels are used quite generally in glass factories for spacing the containers on conveyors in spite of the difficulty encountered in getting the containers to enter the wheel without jamming or breaking. However, the accuracy of star wheels in spacing containers is not satisfactory for certain types of machinery designed to receive the containers from the conveyors. For example, in a certain type of machine for regulating the weight of containers, the container is engaged on a moving conveyor, removed from the conveyor, and subsequently placed back on the conveyor. The arm which engages the container must be accurately synchronized with the container on the moving conveyor; otherwise it will be knocked off and broken.

The present invention overcomes the above difficulties by providing an improved spacing mechanism which will accurately space containers on a moving conveyor both laterally and longitudinally. The containers may be delivered to the conveyor with substantial irregularity in spacing without affecting the operation. The containers delivered by the conveyor will be perfectly synchronized with the moving arm or gripper designed to remove the particular containers from the conveyor. The movement of the spacing elements is such that there is no likelihood of breakage of the containers and the elements are effective where containers are in contact with each other as well as where they are spaced greater than normally.

One object of the present invention is to provide an improved article spacing mechanism which will accurately position articles on a conveyor.

Another object of the present invention is to provide an improved article spacing mechanism which will position articles on a conveyor with precision accuracy.

Another object of the present invention is to provide an improved spacing mechanism which accurately spaces articles on a moving conveyor.

Another object of the present invention is to provide an article spacing mechanism for conveyors which permits greater irregularities in delivery to the conveyor than present spacing mechanisms.

A further object of the present invention is to provide an improved ware spacing mechanism which will positively receive a container from a group of irregularly spaced containers on a conveyor and leave it on a predetermined spot on the conveyor.

A still further object of the present invention is to provide an improved ware spacing mechanism which is simple in construction and easy to maintain.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 4 is a fragmentary top plan view of the spacing mechanism showing the operation of uniformly spacing the articles on a conveyor; and Fig. 5 is a fragmentary plan view similar to Fig. 4 showing the means for positively positioning the articles in the spacing mechanism.

Figure 1:
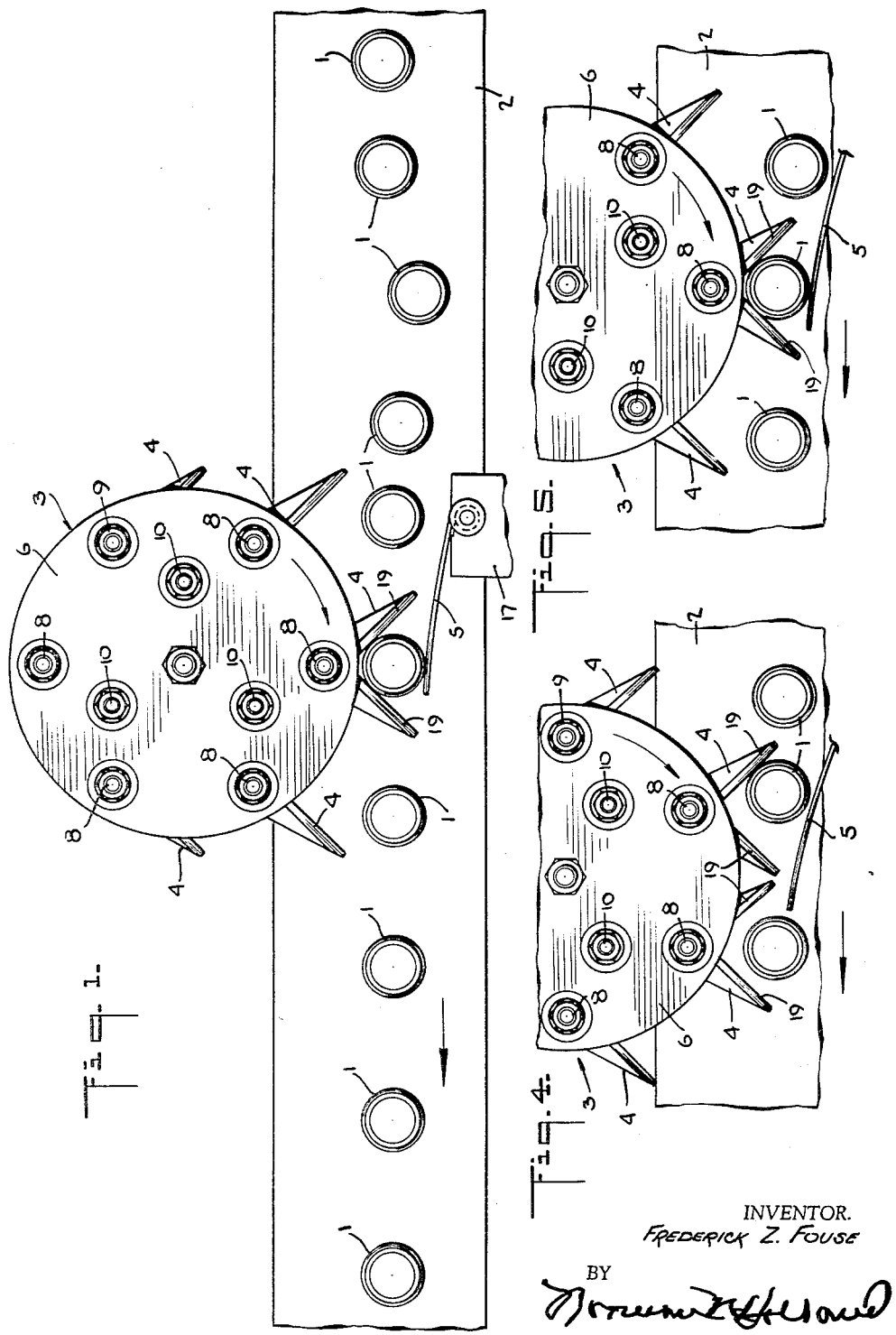
Fig. 1 is a top plan view of the ware spacing mechanism showing the operation of receiving an article from a group of irregularly spaced articles and placing the article on a definite spot on a conveyor.

The operation of the ware-spacing unit will first be described generally with reference to Fig. 1. A plurality of glass articles 1 (shown in the drawings as glass containers) are placed on a conveyor 2 after they have been formed or otherwise processed in a glass machine (not shown). The containers 1 are placed on conveyor 2 in irregular positions and are unevenly spaced as shown at the right-hand side of Fig. 1. In order to uniformly position the containers 1 on conveyor 2 for the next manufacturing operation, the containers 1 are moved by the conveyor 2 past a rotating ware-spacing mechanism 3. The ware-spacing mechanism 3 is provided with a plurality of V-shaped container-receiving members 4 which receive a container 1 and leave the container 1 on a predetermined spot on the conveyor 2 as will now be more fully explained.

The V-shaped receiving members 4 are mounted so that the open face of the V will always face the conveyor 2 to permit containers 1 to be received therein. As spacing unit 3 rotates, the V-shaped members 4 approach the conveyor 2 to engage and receive a container 1. The container is held in the apex of the V by means of a spring-loaded retaining member 5. As the spacing unit 3 continues to rotate, it moves the V-shaped member 4 out of contact with the container 1 thus leaving the container on a definite and predetermined spot on the conveyor 2. The V-shaped members 4 receive successive containers 1 and since each container is left on a definite and predetermined spot on the conveyor 2, the containers 1 will be uniformly spaced with respect to each other, as shown at the left-hand side of Fig. 1.

Figure 2:
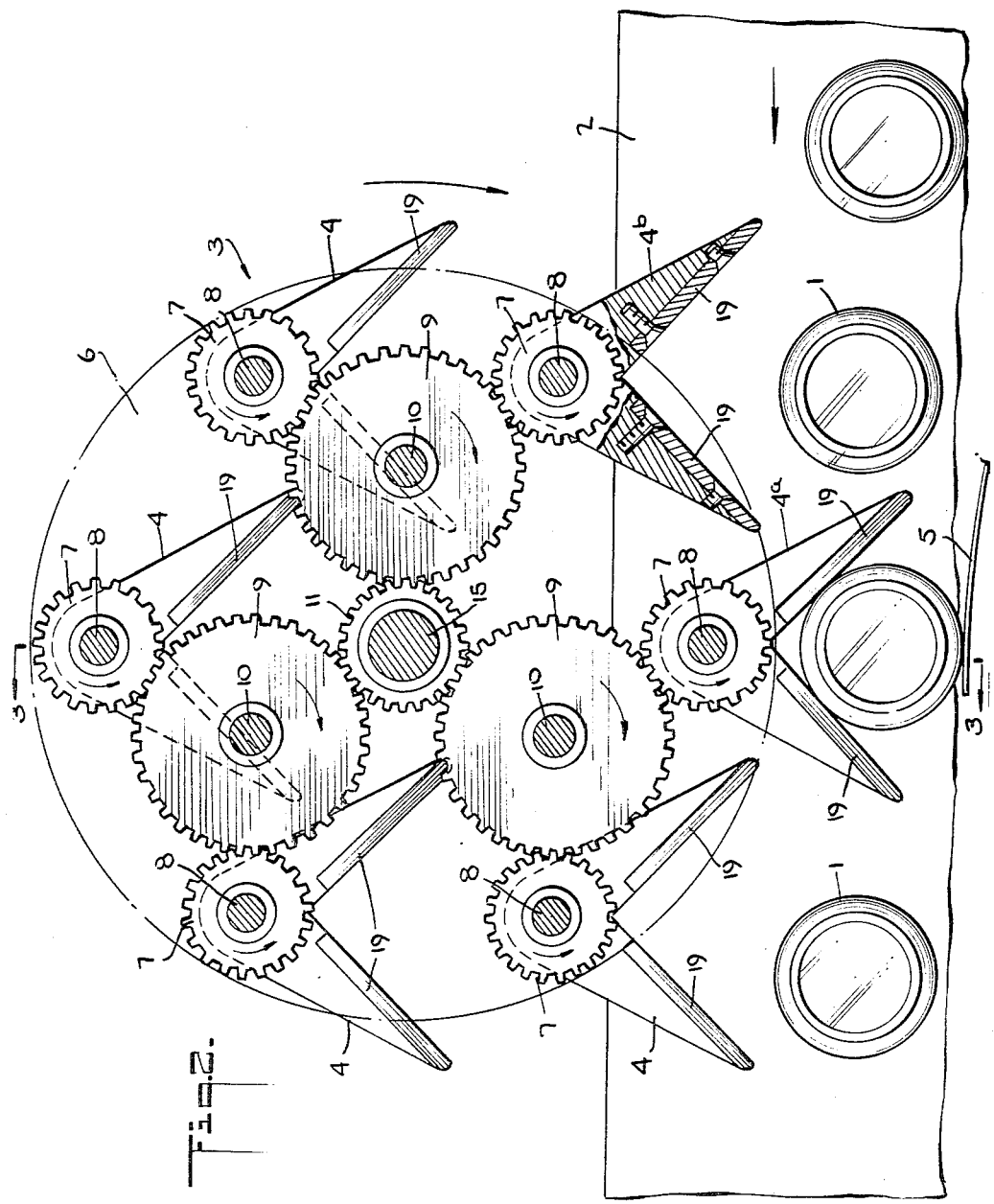
Fig. 2 is a sectional plan view of the ware spacing mechanism with the top plate removed showing the operative elements thereof.
Figure 3:
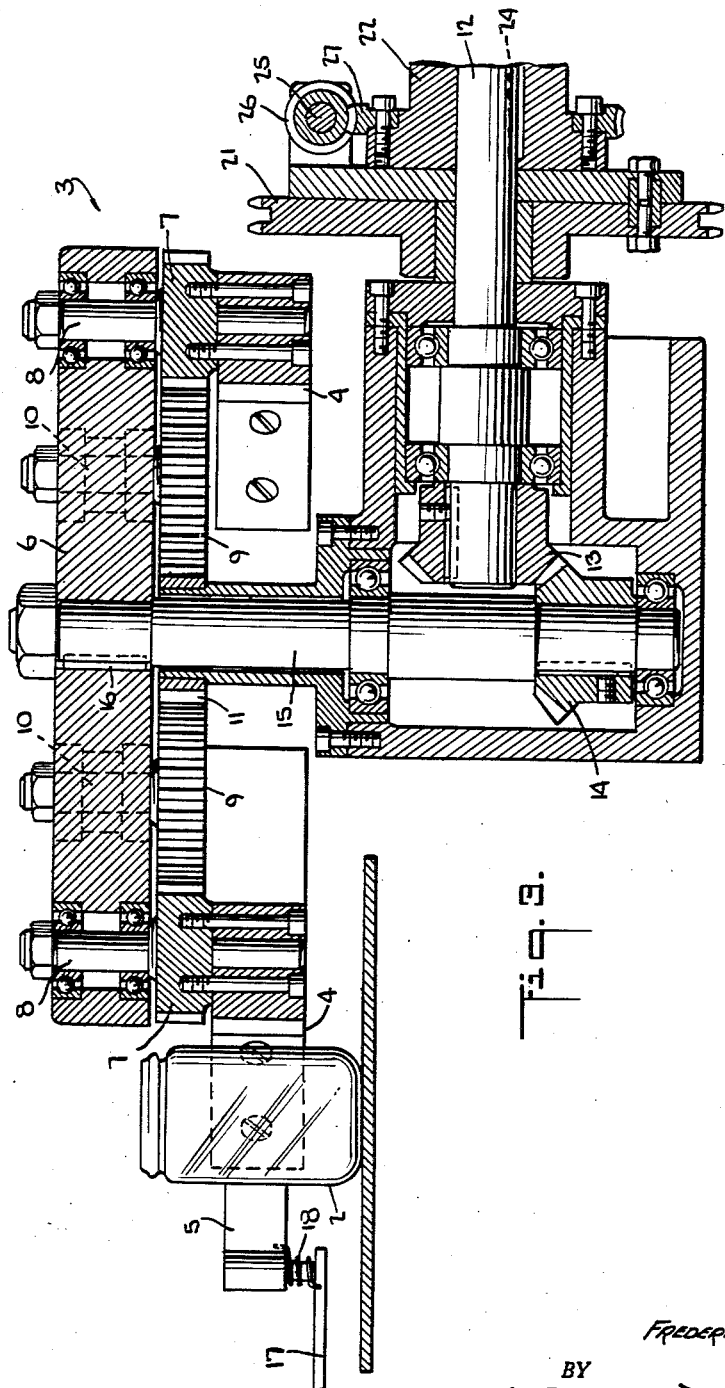
Fig. 3 is a sectional view taken along line 3—3 of Fig. 2 showing the means for driving the spacing mechanism.

Referring more particularly to Figs. 2 and 3, the preferred means for maintaining the open end of the V-shaped members 4 facing the conveyor 2 comprise a system of gears 7, 9, and 11 mounted on a rotating disc 6 (shown in outline in Fig. 2).

As best shown in Fig. 3, the disc 6 is rotated by a drive shaft 12 through the intermediation of bevel gears 13 and 14 and vertical shaft 15 to which the disc 6 is keyed at 16. The V-shaped members 4 are adapted to rotate with the disc 6 and in addition, each V-shaped member 4 also is adapted to turn on its axis through the intermediation of operating gear 7, idler gear 9 and central stationary gear 11. The continued circular movement of the V-shaped members 4 with the disc 6 and the turning of each V-shaped member 4 on its axis permits the open end of V-shaped member 4 to always face the conveyor 2 and be in position to receive a container.

Each V-shaped member 4 is mounted on an operating gear 7 rotatably journalled on the underside of rotating disc 6 by means of a shaft 8. The operating gear 7 meshes with an intermediate idler gear 9 (Fig. 2) which is mounted on the underside of the rotating disc 6 by means of shafts 10 journalled in the disc 6 so that when the idler gear 9 is rotated in one direction the operating gears 7 and the V-shaped members 4 will be turned in the opposite direction. It will be noted that two operating gears 7 mesh with each idler gear 9 so that only one half as many idler gears 9 are necessary to operate with the operating gears 7. This permits the ware-spacing mechanism to be compact. Each of the idler gears 9 mesh with a central stationary gear 11 mounted beneath the rotating disc 6 but fixed against rotation therewith. The operating gears 7 and the central gear 11 have the same number of teeth so that the V-shaped members will turn at the same speed as the rotating disc 3 to maintain their angular relationship to the conveyor 2.

When the disc 6 is rotated in the direction of the arrow the V-shaped members first approach the conveyor 2, pass across it in an arc and thereafter move away from it. The rotation of the disc 6 maintains the V-shaped members 4 facing the conveyor 2 and in position to receive the containers 1. Idler gears 9 rotate with disc 6 and as they mesh with stationary central gear 11 they turn in the same direction as the disc 6. The operating gears 7, on which the V-shaped members 4 are mounted, mesh with idler gears 9 and turn in a direction opposite to the rotation of the disc 6. The effect is to maintain the V-shaped receiving members facing in the direction of the conveyor so as to be in position to receive the container 1.

In order to securely position the container 1 in the apex face of the V-shaped receiving members 4, a guide 5 is mounted on a frame member 17 and is biased by a spring 18 (Fig. 3) toward the V-shaped receiving members 4 to properly position the containers in the apex of the V-shaped members 4.

Carbon inserts 19 are preferably mounted on the inside of the V-shaped members to facilitate the sliding contact between the containers 1 and the V-shaped members 4.

In order to synchronize the rotation of the disc 6 with the movement of the conveyor 2, the drive shaft 12 is operatively connected to the conveyor drive means through the intermediation of sprocket 21 and a suitable drive chain (not shown). The sprocket 21 is adjustably connected to the drive shaft 12 so that the relative positions of the disc 6 and the conveyor 2 may be adjusted as necessary to position the containers 1 at predetermined spots on the conveyor 2. The adjustable connection for the sprocket 21 comprises a hub 22 effectively connected to the shaft 12 by a spline 24 and adjustably connected to a sprocket 21 by connector 25. The connector 25 comprises a worm 26 rotatably mounted on the sprocket 21 and engaging a ring-shaped worm gear 27 on hub 22. Rotation of the worm 26 rotates the hub 22 with respect to the sprocket 21 and thereby also changes the position of the disc 6 with respect to the conveyor 2 through the intermediation of the shafts 12 and 15 which are operatively connected to the hub 22.

The operation of the ware-spacing mechanism will be obvious from the above description. Referring to Figs. 4 and 5, the containers 1 are moved past the rotating spacing mechanism 3 by the conveyor 2. The open faces of the V-shaped members 4 are maintained facing the conveyor 2 by means of gears 7, 9, and 11 (Fig. 2) so that as the disc 6 rotates, the V-shaped members 4 approach the conveyor 2. A container 1 is received in the open face of each V-shaped member 4 and is securely held in the apex thereof by means of the spring loaded guide 5. As the disc 6 continues to rotate, the V-shaped member 4 first moves in an arc across conveyor 2 and thereafter moves away from the conveyor 2 to release the container 1, thereby leaving it on a definite and predetermined spot on the conveyor 2. The V-shaped member 4 makes contact with the container 1 at two points only so that as soon as the V-shaped member 4 begins to move away from the container 1, it loses contact therewith and the container remains on the exact spot it was left in. Hence, there is no dragging of the container 1 after the V-shaped member 4 has been moved out of contact with it and since there is no further contact between the V-shaped member 4 and the container 1, the container will not be disturbed from the exact spot it was placed in. The same operation occurs consecutively to each container 1 by each V-shaped member 4. Since the V-shaped members 4 are symmetrically mounted on disc 6, they are equally spaced from each other so that each container 1 will be left on the conveyor 2 in equally spaced relation to the container which preceded it and to the container which follows it with precision accuracy. Hence, it will be seen that the containers 1 are left in uniformly spaced relationship to each other, thereby permitting them to be properly presented to the glass weighing mechanism and to the cooling lehr.

As a V-shaped member 4 loaded with a container is moving across the conveyor 2, the next V-shaped member 4 is moving toward the conveyor 2. If a container 1 is too close to or too far from an adjacent container, it will be received between the legs of the V-shaped member 4 and will be properly spaced by being centered therein by the force of the resiliently mounted guide 5. Since the V-shaped members 4 maintain a constant orientation with respect to the conveyor 2, it is possible for adjacent members 4 to overlap, as seen in Fig. 2, with respect to members 4a and 4b. This allows the spacer to handle containers 1 which are initially too closely spaced to be handled by the fixed pockets of a star wheel. The constant orientation of the members 4 also allows the arms of the V-shaped member to be relatively longer than corresponding arms of a star wheel so that the members 4 can handle containers 1 which are initially too far apart to be handled by a star wheel with fixed pockets.

It will be seen from the above that the present invention provides an improved ware spacing mechanism which will properly space glass articles on a conveyor with precision accuracy and which will uniformly space the containers even though the articles have been initially fed to the conveyor with a widely varying and random spacing. The mechanism is simple in construction, easy to maintain, and is adapted for compact and sturdy construction so that long life and trouble-free operation are obtained.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an article spacing mechanism, the combination of V-shaped article-receiving members mounted on said mechanism, means for moving a plurality of articles past said V-shaped members, means for moving said V-shaped members toward said articles to permit the articles to be received in the open face thereof, means for moving the V-shaped members away from the articles to leave the articles on said article-moving means in uniform spaced relation to each other, and means for maintaining a constant orientation of said V-shaped members with respect to said article-moving means so that the open faces of the V-shaped members will face said article-moving means.

2. In an article spacing mechanism, the combination of a disc rotatably mounted thereon, article-receiving means rotatably mounted on said disc, means for moving a plurality of articles past said article-receiving means, means for rotating said disc to move said article-receiving means toward said articles to permit successive articles to be received therein, means for maintaining a constant orientation of said article-receiving means with respect to said article-moving means so that the article-receiving means will face the article-moving means whereby continued rotation of said disc will move said article-receiving means away from said articles to leave said articles on said article-moving means in uniform spaced relation to each other.

3. In an article spacing mechanism, the combination of a disc rotatably mounted thereon, V-shaped article-receiving members rotatably mounted on said disc, means for moving a plurality of articles past said V-shaped members, means for rotating said disc to move said V-shaped members toward said articles to permit successive articles to be received in the open face of said V-shaped members, means for maintaining the open face of said V-shaped members facing said article-moving means, whereby continued rotation of said disc will move said V-shaped members away from said articles to leave said article-moving means in uniform spaced relation to each other.

4. In an article spacing mechanism, the combination of a disc rotatably mounted thereon, V-shaped article-receiving members rotatably mounted on said disc, means for moving a plurality of articles past said V-shaped members, means for rotating said disc to move said V-shaped members toward said articles to permit successive articles to be received in the open face of said V-shaped members, gear means on said disc for maintaining the open face of said V-shaped members facing said article-moving means, whereby continued rotation of said disc will move said V-shaped members away from said articles to leave said articles on said article-moving means in uniform spaced relation to each other.

5. An article spacing mechanism as claimed in claim 4, wherein a guide is provided to bear against said articles and hold them in the apex of the open face of said V-shaped article-receiving members.

6. In an article spacing mechanism, the combination of a disc rotatably mounted thereon, a stationary gear mounted in fixed relation to said disc, means for moving an article past said disc, article-receiving means having an open face mounted on said disc, each of said article-receiving means being mounted on a rotatable operating gear, and an intermediate gear mounted on said disc and adapted to mesh with said stationary gear and said operating gear so that rotation of said disc will rotate the article-receiving means in the opposite direction to maintain the open face thereof facing in the direction of said article-receiving means, whereby rotation of said disc will move the article-receiving means toward said article to permit the article to be received in said article-receiving means and continued rotation of the disc will move the article-receiving means away from the article to leave the article on a definite spot on the article-moving means.

7. In an article spacing mechanism, the combination of a disc rotatably mounted thereon, a stationary gear mounted centrally of said disc in fixed relation thereto, means for moving articles past said disc, V-shaped article-receiving members mounted on said disc, each of said V-shaped members being mounted on a rotatable operating gear, and an intermediate gear mounted on said disc and adapted to mesh with said stationary gear and said operating gear so that rotation of said disc will rotate the V-shaped members in the opposite direction to maintain the open face of said V-shaped members facing in the direction of said article-moving means, whereby rotation of said disc will move the V-shaped members toward said articles to permit successive articles to be received in the open face of said V-shaped members and continued rotation of the disc will move the V-shaped members away from said articles to leave said articles on the article-moving means in uniform spaced relation to each other.

8. In an article spacing mechanism, the combination of a disc rotatably mounted thereon, a stationary gear mounted centrally of said disc in fixed relation thereto, a conveyor for moving articles past said disc, V-shaped article-receiving members mounted on said disc, each of said V-shaped members being mounted on an operating gear, and an intermediate idler gear mounted on said disc and adapted to mesh with said stationary gear and said operating gears so that rotation of said disc will rotate the V-shaped members in the opposite direction to maintain the open face of said V-shaped members facing in the direction of said conveyor, whereby rotation of said disc will move the V-shaped members toward said conveyor to permit successive articles to enter the open face thereof and continued rotation of the disc will move the V-shaped members away from the conveyor to leave said articles on the conveyor in uniform spaced relationship to each other.

9. In an article spacing mechanism, the combination of positioning means mounted on said mechanism, said positioning means having an article-receiving portion therein, means for moving a plurality of articles past said positioning means, means for moving said positioning means in a horizontal path toward said articles to permit the articles to be received in the article-receiving portion thereof, means for moving the positioning means in a horizontal path away from the articles to leave the articles on said article-moving means in uniform spaced relation to each other, and means for maintaining a constant orientation of the article-receiving portion of said positioning means facing in the direction of the article-moving means.

References Cited in the file of this patent

UNITED STATES PATENTS

| | | |
|---|---|---|
| 491,680 | Gardner | Feb. 14, 1893 |
| 2,007,981 | Nordquist | July 16, 1935 |
| 2,052,840 | Nussbaum | Sept. 1, 1936 |
| 2,510,568 | Fouse | June 6, 1950 |
| 2,571,036 | Heyne | Oct. 9, 1951 |
| 2,656,033 | Olson | Oct. 20, 1953 |